US006955110B1

(12) United States Patent
Spletzer et al.

(10) Patent No.: US 6,955,110 B1
(45) Date of Patent: Oct. 18, 2005

(54) APPARATUS AND METHOD FOR CUTTING SOFT MATERIALS, ESPECIALLY MEAT

(75) Inventors: Barry L. Spletzer, Albuquerque, NM (US); Diane S. Callow, Albuquerque, NM (US); James F. Jones, Albuquerque, NM (US); Michael A. Kuehl, Albuquerque, NM (US); Dick L. Shaw, Albuquerque, NM (US); Barbara J. Scalia, Sioux City, IA (US)

(73) Assignee: Sandia Corporation, Albuquerque, NM (US)

( * ) Notice: Subject to any disclaimer, the term of this patent is extended or adjusted under 35 U.S.C. 154(b) by 31 days.

(21) Appl. No.: 10/108,950

(22) Filed: Mar. 27, 2002

(51) Int. Cl.[7] ................................................ B26D 1/12
(52) U.S. Cl. .......................... 83/672; 83/340; 83/342; 83/932; 30/302; 241/260.1
(58) Field of Search ........................ 241/260.1; 83/932, 83/672, 665, 340, 342; 30/301, 302

(56) References Cited

U.S. PATENT DOCUMENTS

| | | | | |
|---|---|---|---|---|
| 978,482 A | * | 12/1910 | Petri ........................ 30/302 X |
| 1,446,016 A | * | 2/1923 | Moritz ........................ 83/665 |
| 1,475,316 A | * | 11/1923 | Randall ........................ 30/301 |
| 1,577,619 A | * | 3/1926 | Gammeter .................... 83/342 |
| 1,639,807 A | * | 8/1927 | Oppenheim et al. .......... 83/672 |
| 1,648,422 A | * | 11/1927 | Oppenheim et al. .......... 83/672 |
| 1,699,585 A | * | 1/1929 | Earles .......................... 30/301 |
| 2,183,722 A | * | 12/1939 | Newman .................. 83/342 X |
| 2,571,300 A | * | 10/1951 | Simpson .............. 241/260.1 X |
| 2,829,689 A | * | 4/1958 | Jarvis ........................ 83/342 X |
| 3,515,618 A | * | 6/1970 | Sidles ....................... 83/672 X |
| 3,657,814 A | * | 4/1972 | Bohlman ..................... 30/302 |
| 5,381,730 A | * | 1/1995 | Kim .................... 241/260.1 X |

* cited by examiner

Primary Examiner—Charles Goodman
(74) Attorney, Agent, or Firm—Rod D. Baker

(57) ABSTRACT

An apparatus and method for cutting soft materials such as meat. Two or more spirally mounted helical blades are situated between two supports, and the supports are mounted to a shank. The shank is rotated to impart rotary action to the spiral shear blades, and the entire device may be used to perform various cutting operations. The distal or bottom one of the supports may also be a cutting blade, and a number of versions of bottom cutting blades are useable in the practice of the invention.

5 Claims, 8 Drawing Sheets

APPARATUS AND METHOD FOR CUTTING SOFT MATERIALS, ESPECIALLY MEAT

GOVERNMENT RIGHTS

The Government has rights to this invention pursuant to Contract No. DE-AC04-94AL85000 awarded by the U.S. Department of Energy, and also certain rights pursuant to Cooperative Research and Development Agreement No. SC96/01455, Sandia National Laboratories.

BACKGROUND OF THE INVENTION

1. Field of the Invention (Technical Field)

The present invention relates to apparatus and methods for machining soft materials, particularly cuts of meat, and especially to an apparatus for cutting fatty tissue from meat.

2. Background Art

Under many circumstances, it is difficult to cut soft materials because the soft material may tend to deform, rather than cut, under the pressure of the cutting blade. In commercial meat processing facilities, such as beef processing plants, slabs of meat must be cut efficiently and quickly. Particularly, it is necessary to shear cut fatty tissue from lean tissue to obtain a cut of meat with a specified desirable amount of fat intact upon an underlying layer of lean meat. Currently in most commercial meat processing plants, fatty tissue is cut from carcasses in generally the same manner as has been employed for a century: individual laborers wielding large (sometimes two-handled) trimming knives, which knives are manually drawn across the cut of meat to sever a portion of fat. Typically, the worker must stand immediately proximate to the carcass and pull the knife toward the worker to trim a certain amount of fat while leaving a specified amount of fat upon the lean tissue. Provided a sharp edge is maintained upon the knife, the fat is severed with a sweeping shear cut.

Again, however, it is difficult to accomplish a smooth shear cut of a soft material such as fat, especially if the cutting blade is not optimally sharp. Further, the trimming of meat by manual laborer is inefficient and poses physical dangers to the worker. Ideally, all meat cutting in commercial, high-volume facilities is performed by machines, both to boost efficiency and reduce costs, as well as to remove workers from the dangerous processing line.

However, a shear cut, to be effectively accomplished, preferably involves the application of a blade having an oblique angle of attack, i.e., the line defining the cutting edge is neither parallel nor perpendicular to the direction of blade movement. Shear cuts are best accomplished when the blade is tilted with respect to the material being cut; ordinary examples of this principle are the angled disposition of scissors blades, or the way a skilled chef uses a shallow back and forth action when slicing very soft material such as tomatoes or fresh bread.

A need remains for a method and apparatus for automated shear cutting of soft deformable materials, particularly fatty tissue on meat. Against this background, the present invention was developed.

SUMMARY OF THE INVENTION (DISCLOSURE OF THE INVENTION)

Broadly characterized, the present invention is of a method and apparatus for shear cutting soft materials such as meat. In a preferred embodiment of the apparatus, two or more spirally mounted helical blades are situated between two supports, and the supports are mounted to a shank. The shank is rotated to impart rotary action to the spiral shear blades, and the entire device may be used to perform various cutting operations. The distal or bottom one of the supports may also be a cutting blade, and a number of versions of bottom cutting blades are useable in the practice of the invention.

There is disclosed a method for cutting soft material comprising the steps of providing a central axis defining an imaginary right cylinder, the cylinder having a top perpendicular to the central axis and a wall everywhere equidistant from the axis; arranging at least one shearing blade substantially within the imaginary cylinder, said shearing blade disposed obliquely in relation to the top; rotating the shearing blade about the central axis; and moving the rotating blade into the material. The method can further comprise the step of mounting perpendicular to the central axis a bottom shearing blade at a distal end of the shearing blade. Arranging at least one shearing blade may comprise arranging at least one rectilinear shearing blade, although the at least one shearing blade preferably comprises arranging at least one curvilinear shearing blade. Arranging at least one shearing blade ideally comprises arranging in a helical configuration the central axis at least one spiral shearing blade. Also, the step of arranging at least one spiral shearing blades comprises arranging two, three, or four spiral blades around the central axis. The step of mounting a bottom shearing blade ideally comprises mounting an annular blade concentrically around the central axis. The step of mounting an annular blade comprises the further step of providing a cutting edge on only the exterior circumference of the annular blade, or, preferably, the step of mounting an annular blade comprises the further step of providing cutting edges on both the exterior circumference and the interior circumference of the annular blade. Mounting a bottom shearing blade alternatively comprises mounting a disc blade concentrically around the central axis, the disc blade having a cutting edge on its circumference. Or, mounting a bottom shearing blade may comprise mounting a rectilinear blade symmetrically across the central axis. In yet another method, the step of mounting a third shearing blade comprises disposing at least two sickle-shaped blades radially outward from the central axis.

The invention includes an apparatus for cutting soft material comprising: a central axis defining an imaginary right cylinder, the cylinder having a top perpendicular to the central axis and an imaginary wall everywhere equidistant from the axis; at least one shearing blade substantially within the imaginary cylinder, said shearing blade disposed obliquely in relation to said top; and a shank for rotating the shearing blade about the central axis. The apparatus preferably has a bottom shearing blade mounted perpendicular to the central axis at a distal end of said at least one shearing blade. The one or more shearing blades preferably comprise curvilinear shearing blades, which preferably are spiral shearing blades arranged in a helical configuration about the central axis.

The further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

(BEST MODES FOR CARRYING OUT THE INVENTION)

Figure 1:
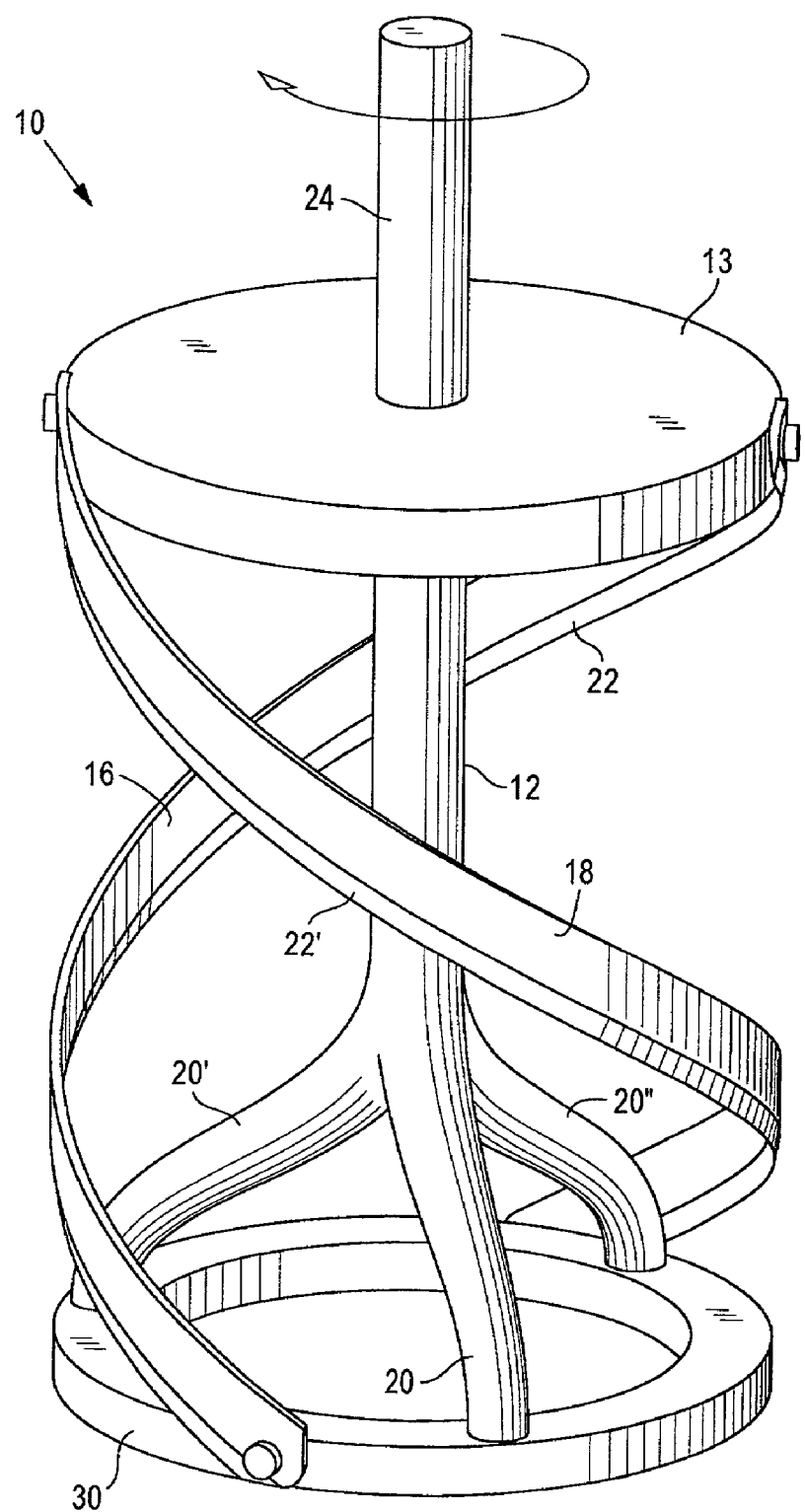
FIG. 1 is a perspective view of one embodiment of the apparatus according to the present invention.

The invention relates to an apparatus for shear cutting soft materials. Soft materials, such as fatty tissue on cuts of beef, tend to deform and then tear, rather than cut, upon the application of a cutting blade. Consequently, "clean," smooth, accurate cuts may be difficult to accomplish on soft materials. The present invention improves upon known methods for trimming soft materials using shear cuts. The invention may find beneficial use in a wide variety of materials machining and cutting situations; it is contemplated, however, that the invention will find immediate useful application in the commercial meat processing industry, especially where it is desirable to replace manual workers with automatic robotic meat-trimming machines.

Thus, the invention is an apparatus for producing a slicing action when performing either horizontal or vertical rotary machining-type operations. As mentioned, a sharp slicing action is necessary for cutting or machining soft materials, especially where the cutting forces encountered when using typical machine tools deforms the work piece instead of removing material. The method of the invention not only provides a slicing action which simulates knife cutting, it also provides a large amount of relief, making large depths of cut possible. Additionally, it allows for simple replacement of blades when the cutter gets dull.

Features of the invention include but are not limited to:

1) A horizontal rotary cutter made from flexible band material which produces a slicing action in a peripheral-milling process.

2) The use of spacers and supports to produce a viable horizontal cutter made from flexible band material.

3) The use of flexible band material combined with a sharpened lower support in a vertical cutter for producing a slicing action in a face milling arrangement.

4) The use of sharpened spokes in the lower support section of a vertical cutter.

5) The use of a sharpened disc for providing slicing action in the lower support in a vertical cutter.

6) The use of an annular "doughnut" shape with sharpened edges on both the inner and outer curvatures of a lower support to allow slicing action when the cutter is plunging and moving forward in a face milling arrangement.

Other possible features include the use of other geometries for producing slicing action on the lower support of a vertical cutter, such as a curved spoke arrangement similar to a food processor blade.

The slicing-type cutter according to the invention is produced by wrapping flexible blade material in a helical manner between two supports. Generally, the components of the inventive apparatus are crafted from durable metals, such as stainless steel and/or aluminum, although rigid plastics may also serve as construction material for some elements. The cutter can be disposed for use either horizontally or vertically. In a horizontally disposed cutter, additional supports and spacers may be used along the length of the cutter to provide support for the flexible blade. In a vertically disposed cutter, the flexible blades along the sides of the cutter produce some of the slicing action, however much of the slicing is produced by a lower blade. The sharp lower blade can be provided in any of a variety of effective configurations be either round (like a pizza-wheel cutter), doughnut-shaped with sharpened edges on both the inside and outside curvature, or spoke-like with sharpened edges on each spoke, as further described herein.

In the practice of the invention, the cutter with helically arranged blades and sharp cutter blade is rotated about a central axis and applied to the material to be cut. Rotary power may be supplied to the shank of a central support on which the blades are mounted. Further, the cutter can be lowered and lifted to and from the work piece by powered mechanics, such as electric and pneumatic systems. In one use of the cutter apparatus, it is deployed vertically with the central axis generally perpendicular to the surface of the material to be trimmed. Alternatively, the apparatus may be disposed horizontally, and rotated about an axis that is roughly parallel to a work piece.

Reference is made to FIG. 1, showing an overall perspective view of one embodiment the cutter 10 of the invention. At least one, and preferably two or more spiral shearing blades 16, 18 are arranged in a helical configuration around an axial central support 12, the support 12 being collinear with the (imaginary) longitudinal axis of the cutter. (In embodiments of the invention featuring a shallow helix, a single shearing blade 16 may suffice.) The axis of radial symmetry also is the axis of rotation. The central support 12 has an extending shank 24 by which the cutter, and thus the spiral blades 16, 18, are supported and rotated around the central axis. The shearing blades 16, 18 are held in place by attachment to a top plate 13 and a bottom plate 30. Both the bottom plate 30 and the top plate 13 are secured to the central support 12 so as not to be rotatable in relation to it. Preferably, the central support 12 is provided with at least two, more preferably three or four legs 20, 20', 22" that diverge radially outward to their connection with the bottom plate 30.

A cutter 10 can be manufactured in nearly any practicable size, depending upon the trimming process to be undertaken. A small cutter 10 for use in fine trimming operations on small objects might have, for example, a diameter of only about 3.0 cm and an axial length of 5.0 cm. A very large cutter 10 might present a diameter of 30.0 cm or more, with an axial length of 50.0 cm. It is contemplated that cutters according to the invention more typically will feature diameters of from about 5.0 to 15.0 cm, and axial lengths (including the shank 24 of the support 12) of from about 8.0 to 25.0 cm, but these dimensions are offered by way of illustration only.

Figure 2:
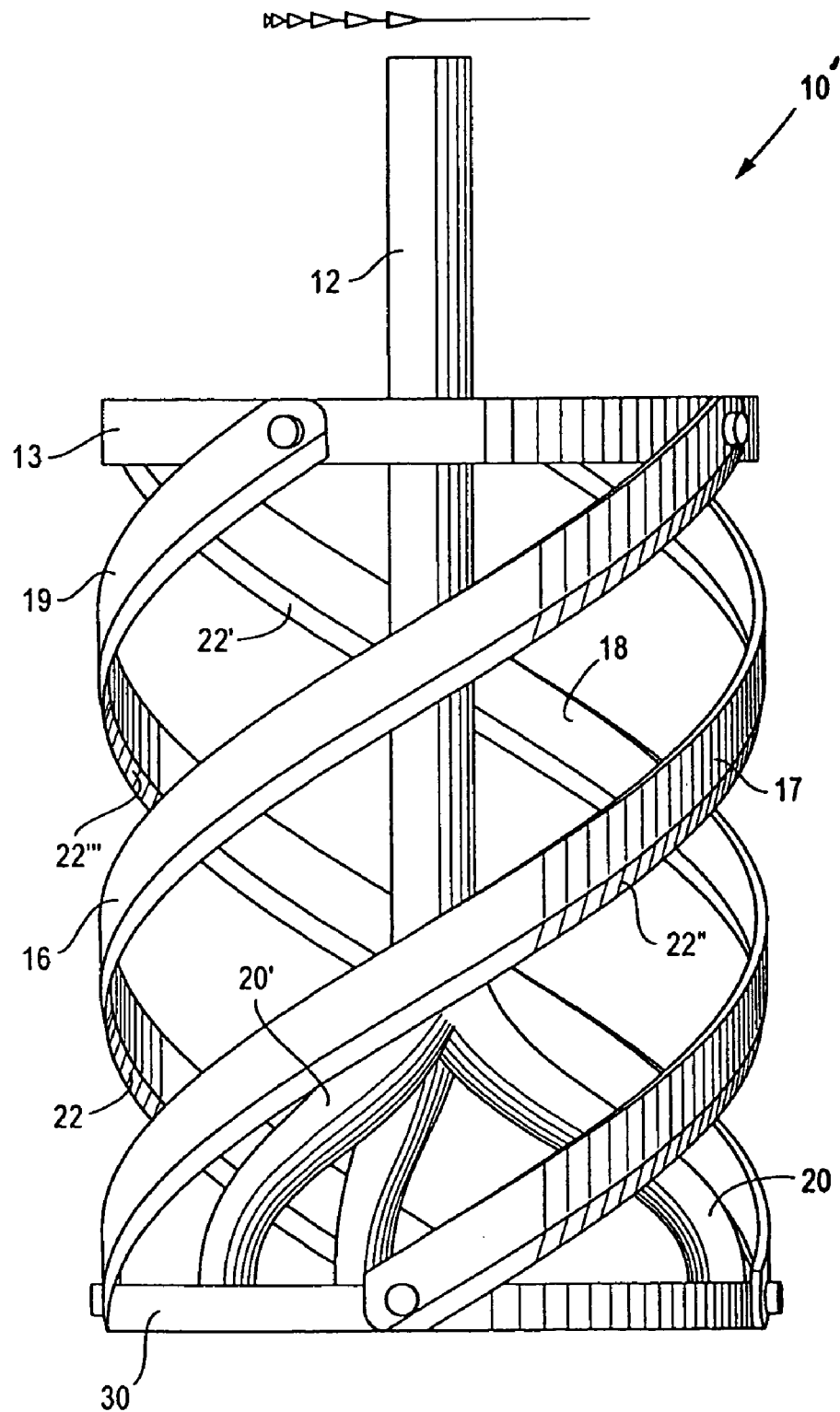
FIG. 2 is a side elevation view of another embodiment of the apparatus according to the present invention.

In the preferred embodiment, the proximal ends of the blades 16, 18 are affixed to the rigid, disc-shaped, upper or top plate 13 which serves to support and anchor the blades. The shearing blades 16, 18 are at least one, but very preferably two or more in number, and alternative embodiments of the invention employ a greater plurality of shearing blades, for example, four blades, or potentially more, uniformly spaced in multiple helixes. FIG. 2 illustrates an embodiment of the apparatus 10' of the invention having four parallel arranged shearing blades 16, 17, 18, 19. Most preferably, but not necessarily, the shear blades number three or four. The shearing blades 16, 18 preferably are modestly flexible (bendable in directions normal to the flat surfaces of the blade), such as band saw blades or segments of such blades, to permit them to be twisted into a helical disposition as seen in the figures. Nevertheless, the blades 16, 18 must be sufficiently stiff such that when fastened in place upon cutter 10' they undergo little displacement or bending during use. The shear blades 16, 18 preferably are fashioned from stainless steel. In the most preferred embodiment, the connection between the blades 16, 18 and the plate 13, and between the blades and the bottom plate 30 (or the distal ends of the legs 20, 20', 22") is reversible but secure, as by small screws or removable rivets, to allow any particular blade to be removed and replaced. Accordingly, when a given blade breaks or becomes dull, the temporary connectors attaching that blade to the plate 13 and the bottom plate 30 may be reversed, the expended blade removed, and a new blade installed. Other attachments, such as snaps or detents, are also possible.

Most preferably, the number of legs 20, 20', 22" corresponds to the number of spiral shearing blades 16, 18, so that added structural integrity is supplied by connecting the distal ends of the spiral shearing blades to the end of an associated leg. However, it is advantageous, but not essential, to provide at least three legs on certain versions of the apparatus having only two shear blades 16, 18, as additional legs provide added structural strength. Nevertheless, a three-bladed cutter preferably features three equally spaced legs extending radially downward from the support 12, a four-bladed cutter features four legs, and so forth. Alternatively, the spiral shearing blades 16, 18 may be connected to the bottom plate 30 itself, with the bottom blade being removably mounted upon the ends of the legs (of any number).

Mounted perpendicular to the central axis defined by the central support 12 is the bottom, or third, shearing plate or blade 30 at the distal ends of the spiral shearing blades 16, 18. In less efficient embodiments of the apparatus, and as seen in FIG. 1, the bottom plate 30 is unsharpened, and rather merely is a disc- or annular-shaped bottom plate similar or identical to the top plate 12.

As will be appreciated by referring to the figures, therefore, the method of the invention includes providing a central axis defining an imaginary right cylinder, the cylinder having a top 13 perpendicular to the central axis and a wall everywhere equidistant from the axis, and arranging one or more shearing blades 16–18 substantially within the imaginary cylinder. The shearing blades are disposed obliquely in relation to the top 13, and the method broadly described then involves rotating the shearing blades about the central axis; and moving the rotating blades 16–18 (e.g., axially along the axis of rotation) into the material to be cut. Such a method includes the optional but preferable added step of mounting perpendicular to the central axis a bottom shearing plate 30 at the distal ends of the shearing blades. As mentioned, the shearing blades 16–18 preferably are curvilinear, such as to form a helix, but alternatively may be substantially rectilinear but still disposed substantially within the imaginary cylinder. The preferred method involves arranging at least one shearing blade in a helical configuration about the central axis.

In the practice of the invention, the spiral shearing blades 16, 18 and the bottom third shearing plate or blade 30 are rotated around the central axis, and the entire cutter 10, while rotating, is controllably moved into the material to be trimmed, such as fatty tissue. Axial or radial oscillation may also be employed to improve cutting efficiency.

Figure 2A:
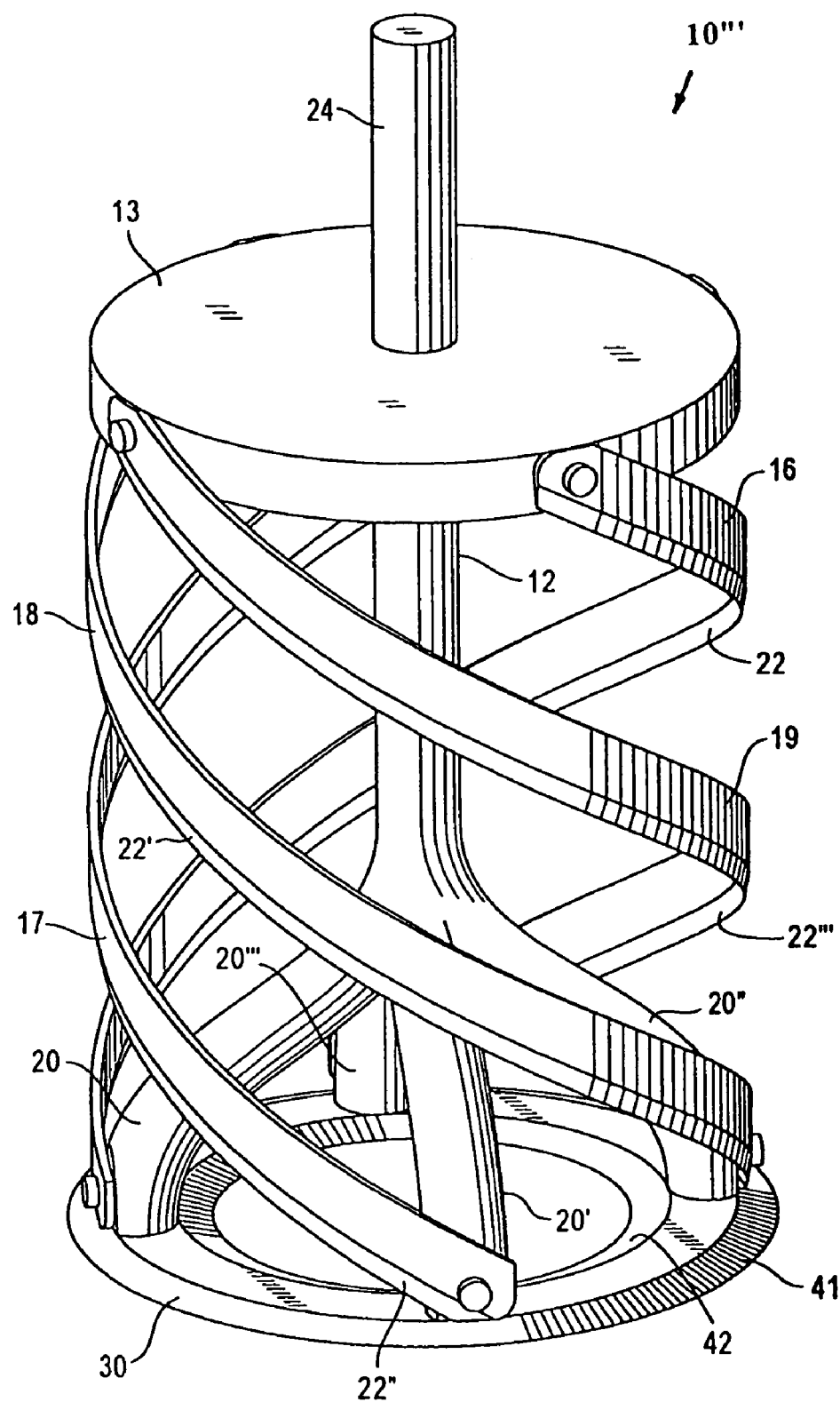
FIG. 2A is a to end perspective view of the embodiment of the apparatus seen in FIG. 2.

Again, the simplest embodiment of the apparatus has one or two spiral blades arranged around the central axis, but alternative embodiments may have more than two spiral blades arranged around the central axis. FIG. 2 shows a cutter 10' having four spiral shearing blades 16, 17, 18, 19 arranged in a uniform quadruple helix about the central axis defined by the central support 12. In this and all embodiments of the cutter, the spiral blades 16–19 are spaced to define regular uniform helixes, as best seen in FIG. 2. The blades 16–19 depend in a spiral from the top plate 13 down to the bottom plate or blade 30. The very sharp cutting edges 22, 22', 22", 22'" of each of the corresponding spiral shearing blades 16, 17, 18, 19 are on the downward, or distal, edge of the blades. Again, and as best seen in FIG. 2A, the number of legs 20, 20', 20", 20'" preferably, but not necessarily, corresponds to the number of shearing blades, so that the distal end of each of blades 16, 17, 18, 19 is fastened to the end of a leg.

Combined reference is made to FIGS. 1 and 2. The lower or distal edge of each of the spiral shearing blades 16–18 is sharpened to define the cutting edges 22, 22', 22", 22'" of the shearing blades. Further, and as indicated by the directional arrows in FIGS. 1 and 2, the cutter is rotated so that the downward-facing cutting edges 22, 22', 22", 22'" are the "leading" edges of the moving blades 16–18. Thus, and as best indicated in FIG. 2, the spiral shear blades 16–18 "lean into" the direction of rotation, that is, the distal end of a blade is the last point on the blade to pass a circumferential coordinate as the cutter rotates. Accordingly, the shear blades 16–18 effectively "descend" upon the work piece at an oblique angle, and thus simulate the action of a manually wielded knife to realize a relatively clean shear cut with minimal tearing or squashing.

It will be understood by one skilled in the art, however, that the invention may desirably be practiced with the sharp cutting edges 22, 22', 22", 22'" of the spiral blades facing upward, and the direction of rotation reversed from that shown in the figures. In such alternative embodiments, the cutting action of the spiral blades is performed while the inventive cutter is being lifted upward in the material to be cut. It is apparent, therefore, that the most sophisticated versions of the invention, particularly those suited for vertically disposed "plunge" cutting, may feature spiral blades having both edges sharpened for cutting.

The third shearing bottom plate or blade 30 comprises a blade mounted concentrically around the central axis and the axial central support 12. The bottom plate 30 may have a variety of configurations, and in one embodiment of the invention an assortment of bottom plates or blades are interchangeable. Thus, with the bottom blade removably attachable to the cutter 10, the operator may select and install a particular type of bottom plate or blade best suited to the cutting task at hand.

In simple embodiments of the apparatus, the plurality of legs 20, 20', 20" may be essentially mutually coplanar, i.e., they may simply extend radially outward, spoke-like, from the distal end of the support 12 to the ends of the spiral shearing blades—and thus be essentially coplanar with the bottom plate or blade 30 as well. However, it is very preferable that the legs 20, 20', 20" not be co-planar with the bottom plate 30, but rather that they depart and diverge radially outward and downward from a point above the bottom plate 30, as seen best in FIGS. 1 and 2. Legs 20, 20', 20" arched in such a manner do not interfere with passage of the material trimmed away from the work piece, especially for versions of the bottom blade 30 other than the solid disc blade 30' of FIG. 3A. During the practice of the invention using the bottom blades illustrated in FIGS. 3B–D, as fatty tissue or other material is trimmed away by the cutter 10, it must be moved away from the apparatus. The use of arched legs 20, 20', 20" allows the material trimmed away to move upward in the cutter 10, without immediately encountering obstructive legs, and then move outwardly between the legs to make room for more trimmings as cutting progresses.

Figure 3A:
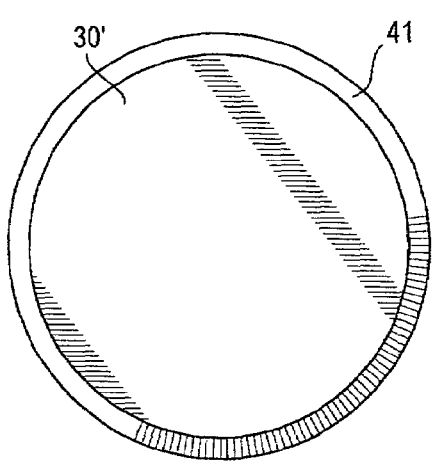
FIG. 3A is a bottom view of one embodiment of the apparatus according to the present invention.

Reference is invited to FIG. 3A, a bottom view of a vertically oriented cutter 10, showing a simple version of the bottom blade. The third, or bottom blade 30' may simply be a disc blade disposed concentrically around the cutter's central axis. In this embodiment, the bottom blade 30' is a circular solid disk, preferably fashioned from stainless steel. The blade 30' may be, for example, about 0.75 to about 2.0 mm thick on a cutter 10 having a diameter of approximately 6.0 to 10.0 cm. The outer perimeter or circumference of the disc bottom blade 30' is razor-sharp to define its cutting edge 41. Thus, this version of the bottom blade 30' is reminiscent of the wheel blade encountered on ordinary pizza-cutters, although it functions in a distinguishable manner.

Figure 3B:
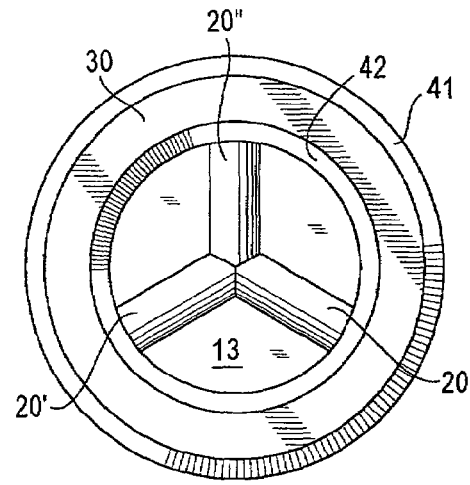
FIG. 3B is a bottom view of another embodiment of the apparatus according to the present invention.

FIG. 3B shows an annular bottom blade 30, as also seen in FIG. 1. The annular blade 30 defines a central opening therein, so that the overall blade defines a ring. In one version of annular blade 30 a sharp cutting edge 41 is provided on only the exterior circumference of blade. More preferably, cutting edges 41 and 42 are provided on both the exterior circumference and the interior circumference of the annular blade 30.

Figure 3C:
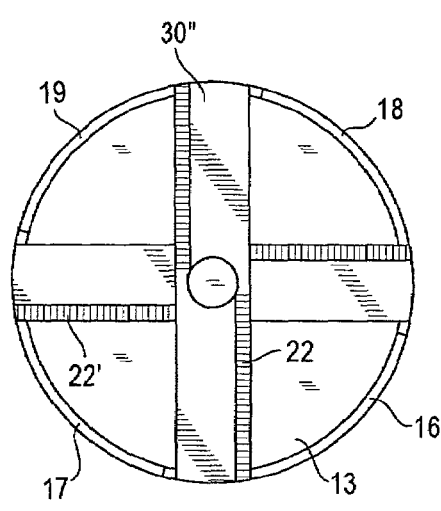
FIG. 3C is bottom view of yet another embodiment of the apparatus according to the present invention.

In still another embodiment of the cutter 10 the bottom blade 30 features rectilinear knives, rather than circular blades. Thus, a third shearing blade 30" may be one or more rectilinear knives or blades mounted across the central axis. For example, a single rectilinear blade may be situated perpendicular across the axis, generally parallel to the top plate 13. More preferably, however, a pair of mutually perpendicular rectilinear blades constitute the bottom blade 30" defining a cross, as depicted in FIG. 3C. Two cutting edges 22, 22' are provided on sides of each rectilinear blade, also as seen in FIG. 3C. The cutter 10 is rotated in a direction (counter-clockwise in FIG. 3D) so that the cutting edges 22, 22' address the material to be trimmed.

It is noted, referring to FIG. 3C, that individual knives that may be saw blades or other off-the-shelf blades having sharp cutting edges running along only one side, meaning that only one-half the length of each cutting edge actually addresses the work piece during operation, since each blade is rotating about its medial point. But, as actually depicted in FIG. 3C, in more sophisticated or customized versions of the apparatus, each blade may be provided with a sharp cutting edge on opposite long sides of the blade, with the transition from one side to the other occurring midway along the blade's length, so that the full length of the rotating blade presents a cutting edge during rotation.

Figure 3D:
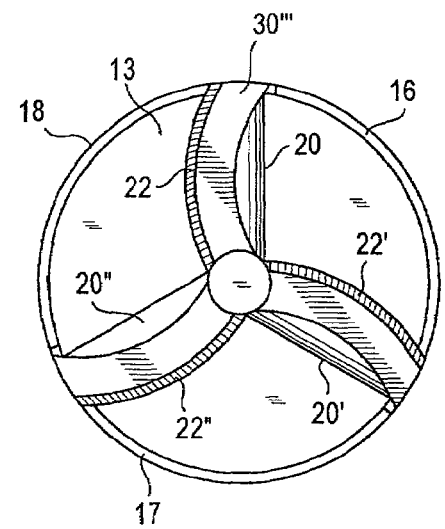
FIG. 3D is a bottom view of still another embodiment of the apparatus according to the present invention.

The most sophisticated version of the bottom blade is seen in FIG. 3D. In this version, the bottom blade 30''' has two or more sickle-shaped blades extending radially outward from the central axis. The sickle-shaped, or acinaciform, blades are curved so to present, in the plane perpendicular to the central axis, a convex profile. This convex leading edge of each acinaciform blade is provided with a razor-sharp edge 22, 22', 22" for cutting. The cutter 10 is rotated, of course, in a direction (counter-clockwise in FIG. 3D) so that the cutting edge 22, 22', 22" address the material to be trimmed.

In an alternative embodiment of the invention, the shearing blades 16, 17, 18, 19 are arranged not in a parallel configuration, but are disposed in opposite directions. In one example of this embodiment seen in FIG. 7, one pair of shearing blades 16, 18 are disposed on the cutter 11' to spiral or incline upward in relation to the direction of rotation, while the other pair 17, 19 spiral or incline in the opposite sense, downward in the direction of rotation (direction of rotation indicated by directional arrow around shank 24 in FIG. 7). Cutting edges 22, 22', 22", 22''' of the shearing blades 16–19 are upon the appropriate "leading" sides of the blades so as to address the material being cut when the cutter 11' rotates in the operative direction. An advantage of this embodiment is that the shearing blades 16–19 serve as a free-stranding truss, eliminating the need for a central support (e.g. element 12 in FIG. 1).

Figure 7:
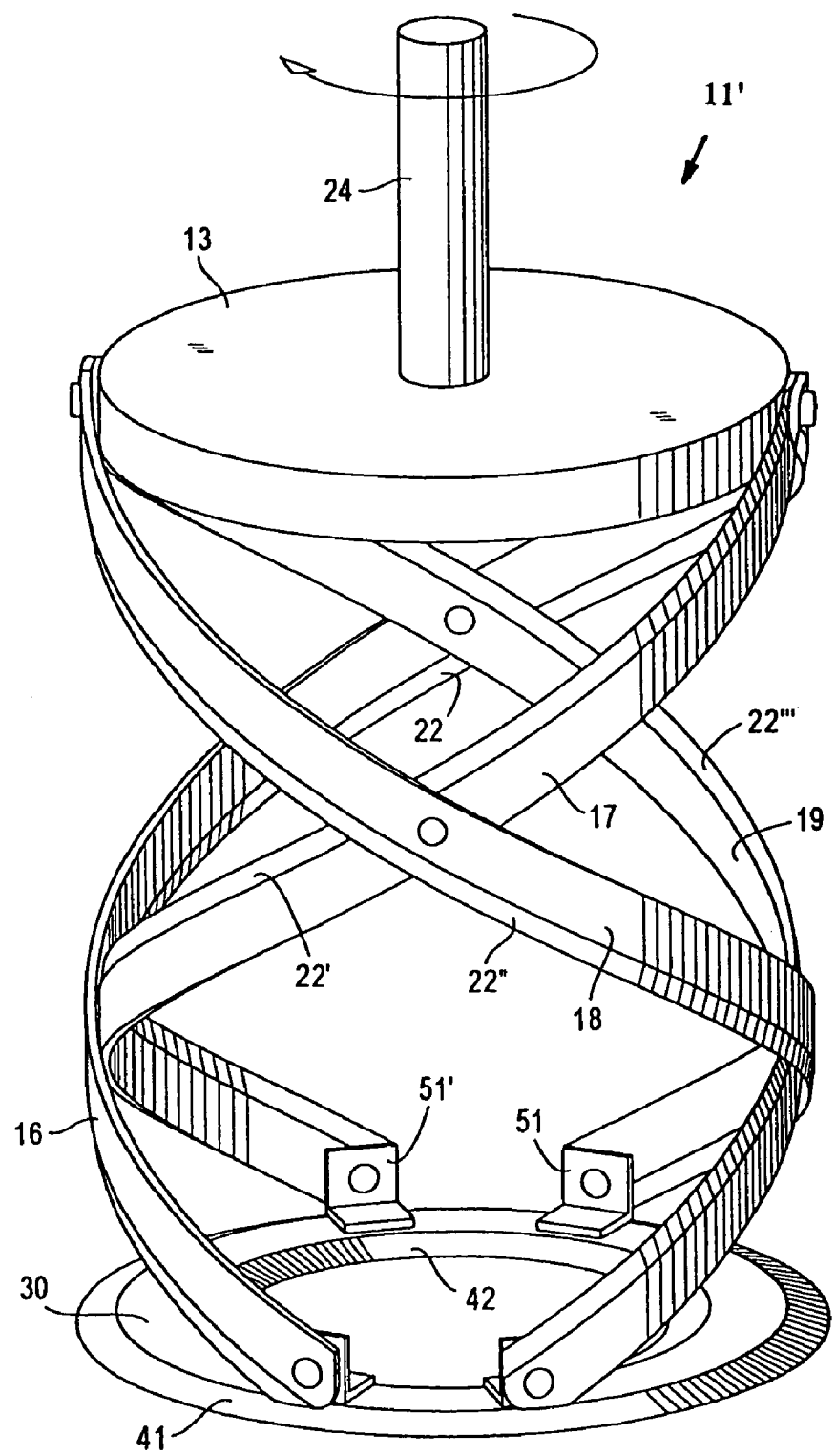
FIG. 7 is a side view of yet another alternative embodiment of the apparatus of the invention.

In the embodiment of FIG. 7 and all other embodiments, the distal ends of the shearing blades 16–19 may be attached directly to the bottom blade 30 by angle brackets 51, 51'. The use of angle brackets 51, 51' or similar connectors permits the bottom blade 30 to be very thin to accommodate very sharp exterior and/or interior annular cutting edges 41, 42 (FIG. 3B), and yet to serve as an anchor for the distal ends of the shearing blades in the absence of supporting legs 20, 20' or in instances where the number of legs does not equal the number of shearing blades.

Figure 8:
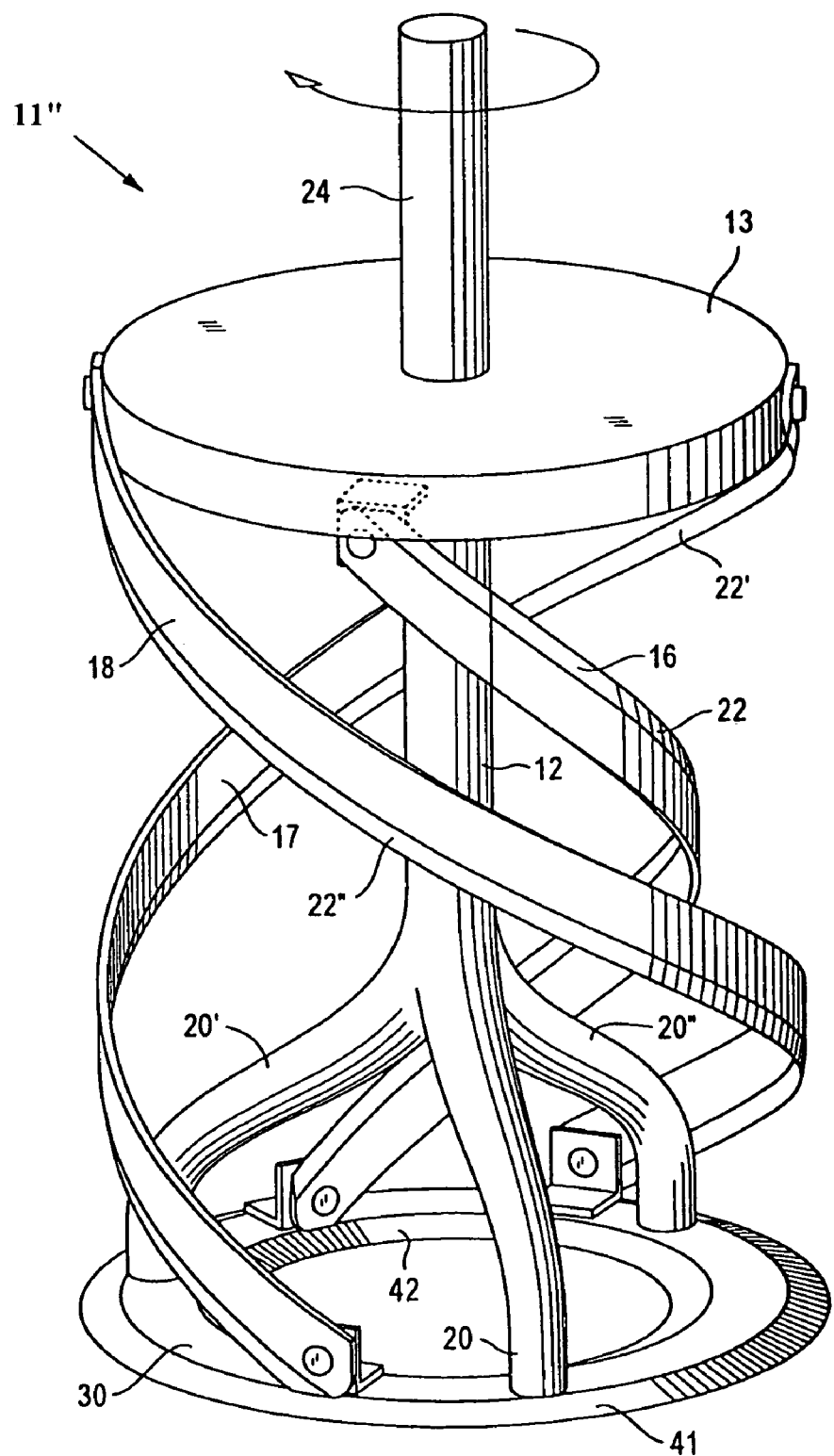
FIG. 8 is a side view of still another alternative embodiment of the apparatus of the invention.

In yet another alternative embodiment of the invention, depicted in FIG. 8, the shearing blades are arranged within the cutter 11" in reference to two different radii, an inner radius and an outer radius. This embodiment of the apparatus of the invention employs the version of the bottom blade 30 seen in FIG. 3B. The annular bottom blade 30 has an inner radius defining its central opening (bounded by the inner cutting edge 42), and an outer radius defining the circumferential perimeter (cutting edge 41). In this embodiment, one or more shearing blades 16 are disposed substantially within the imaginary cylinder defined by the inner radius, while one or more other blades 17, 18 are disposed substantially within the imaginary cylinder defined by the outer radius. The interior blade 16 advantageously chops and minces material cut by the inner cutting blade 41 of the annular bottom blade 30 and passing upward through the central opening of the bottom blade. This comminuting action of the inner blade 16 promotes free passage and cast-off of material shavings generated during operation of the apparatus.

Ordinarily, in the method of the invention the rotation of the spiral shearing blades 16–19 is around the central axis of rotation situated approximately perpendicular to the tissue to be cut or trimmed. The cutter 10 can be moved selectively up and down, co-linearly along its axis, to accomplish plunge cuts. Thus, the incipient cutting action, as the cutter 10 is moved down into the object to be cut, is accomplished by the bottom blade 30, whatever its configuration. However, as the cutter 10 is controllably plunged further into the cut of meat or other work piece, the rotating spiral shear blades 16–18 assume an increasing fraction of the cutting work.

Figure 4:
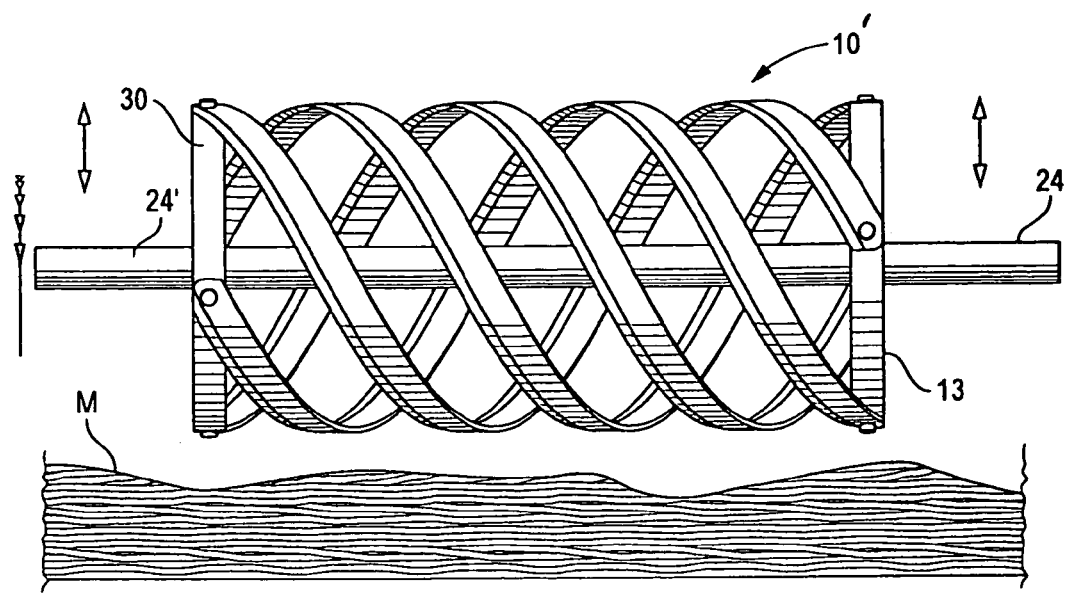
FIG. 4 is a side elevation view of an alternative embodiment of the apparatus according to the invention shown disposed with its axis parallel to and above the surface of the material to be cut.

Alternatively in the method of the invention, while rotating the shearing blades are rotated to commence the cutting action, the central axis may be situated approximately parallel to the tissue to be cut, as seen in FIG. 4. This practice of the invention may be especially well-suited in circumstances where it is desired to trim broad swaths of material quickly, and careful contouring of the trimming is not necessary. Also, in this embodiment, rotary power may be supplied to either or both ends of the central support 12, which may extend axially beyond not only the top plate 13, but the bottom blade 30 as well. In this embodiment, however, the bottom blade 30 may be an unsharpened bottom plate similar to top plate 13, or alternatively, both ends of the cutter 10' may be capped with sharpened bottom blades 30. Moreover, as seen in FIG. 4, the central support 12 need not diverge to define separate "legs." The protruding shanks 24, 24' of the central support 12 may be used by automated equipment to move the cutter 10' toward and from the meat M or other item to be trimmed, as indicated by the directional arrows in FIG. 4. Indeed, the cutter 10' optionally can be canted in relation to the meat M by controllably situating the opposite ends of the central support at different elevations.

Figure 5:
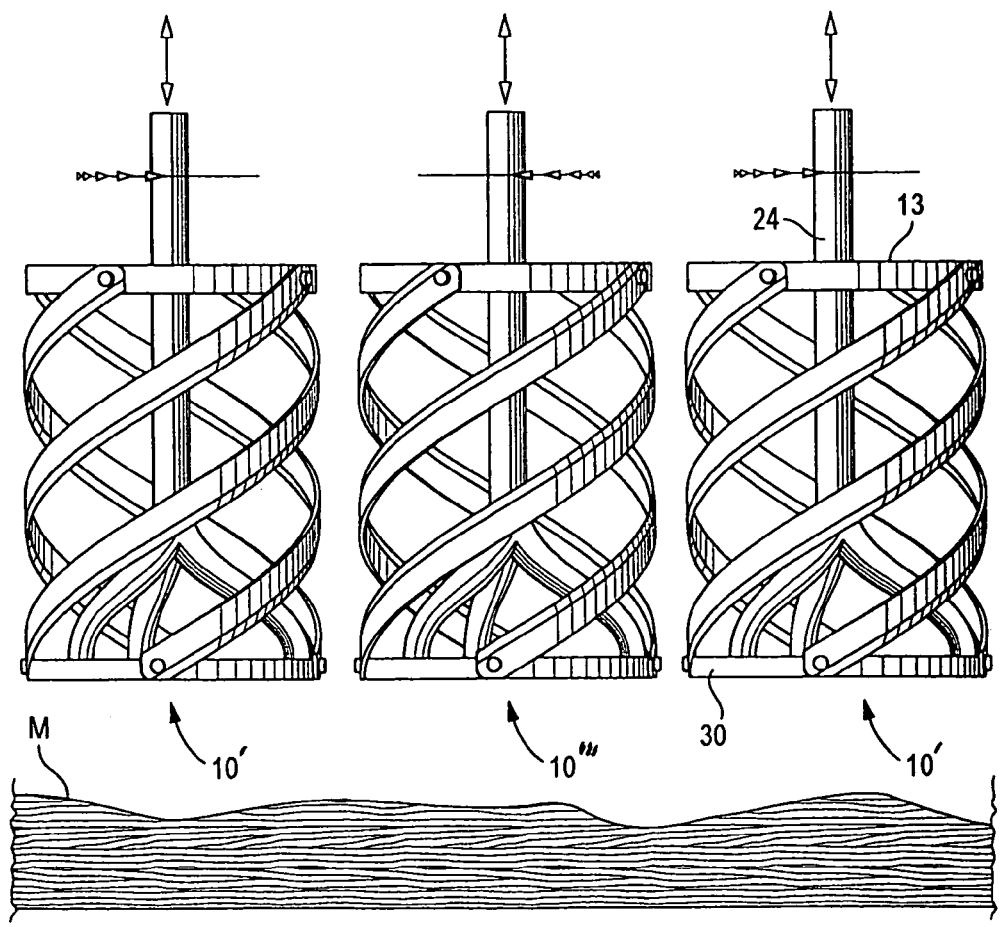
FIG. 5 is a side elevation view of a plurality of apparatuses according to the invention, as seen in FIG. 2, positioned above the surface of a material to be cut.

Reference to FIG. 5 shows that a plurality of cutters 10', 10''' (for example, such as the cutter 10' seen in FIG. 2) can be arranged and deployed in a line or an array, so as to simultaneously perform the trimming operation. Preferably, cutters in such a line do not all rotate in the same direction, rather, performance is enhanced if every other cutter rotates in the same direction, e.g. in a line of three cutters, cutter numbers 1 and 3 rotate counterclockwise, while cutter number 2 (between the other two), rotates clockwise, as indicated in FIG. 5. In such an embodiment, the direction or "sense" of the pitch of the helix, or the direction of inclination, of the shearing blades must also be reversed in alternating cutters, to correspond to each cutter's direction of rotation, also as indicated in FIG. 5. Nevertheless, it is readily understood that for simplicity of construction and operation, the cutters 10', 10''', 10' in a line or array may all rotate in the same direction, and it is intended to include such an array in the scope of the invention.

Further, the up-and-down movement of the cutters 10', 10''', 10' may be coordinated so that the plurality of cutters move up and down together. Alternatively, and in more sophisticated applications, automated or manually controlled equipment or robotics may provide independent movement and operation of each individual cutter 10' or 10''' by means of its separately associated shank 24. Independently controlling each one of a banked line or array of a plurality of cutters permits the trimming to be performed in a "sculpting" manner, that is, to selectively contour the surface being processed. A horizontal cuter can also result in a sculpting action. If multiple cutters are raised and lowered and canted appropriately, the result is a sculpted piece.

INDUSTRIAL APPLICABILITY

Tests performed with a stationary-cutter fat trimmer according to the invention were conducted at cutter speeds of approximately 300 rpm to 960 rpm. At this speed, the stepper motor used with the apparatus had very low torque capabilities, so only very small depths of cut were taken. However, there was no observed detriment to cutting at very fast speeds, and the surface finish appeared to be smooth. Thereafter, it was determined to use a different motor for use on a moveable-cutter fat trimmer. The motor used on the moveable cutter was ½ HP, and capable of speeds to 2500 rpm; a speed controller for use with the motor was calibrated prior to use.

In one version of a moveable trimmer using a cutter apparatus according to the invention, the motor is mounted rigidly to the cutter and the cutter is mounted in an aluminum housing. The cutter/motor assembly pivots on two bearings mounted in the center of the housing. The bearing shafts are mounted in a U-shaped bracket, which connects to a linear stage that controls the cutter height. Another bearing mounted at the end of the cutter housing rides in a slot in the bracket, which is attached to another linear stage that controls the cutter angle. The slot accommodates the change in projected length as the cutter pivots.

In one prototype manufactured according to the invention, the cutter consisted of two band saw blades wrapped around and mounted onto two circular plates forming a helix. An additional center support provided rigidity. This embodiment of the cutter had several features, including: (1) It more closely simulates knife cutting of fat; (2) It provides a large amount of relief making large depths of cut possible; and (3) When the cutter gets dull, the band saw blades are simply replaced eliminating the need for costly grinding of helical cutter.

Several additional cutting tests were performed on various embodiments of the cutter. A band saw blade cutter used two cutting blades wound in a fairly loose helix angle. A second cutter was fabricated which utilized four cutting blades wound in a tight helix. Tests performed on the second cutter indicated that the higher helix angle was better for cutting through fat. However, the use of four blades resulted in a tendency to trap and build up fat shavings from the center of the cutter. Regardless of blade number, fat shaving build-up is not as great a problem on trimmers operated at high rpm cutting speeds.

The invention is fully exploited when used in conjunction with automatic fat thickness sensors, which allow the trimming process to be fully automated. A suitable optical probe for determining the fat thickness is disclosed in U.S. Pat. No. 6,285,904 to Weber, et al. When the fat thickness sensor is installed just behind the cutter, it must ride directly on the top of the newly trimmed fat to provide accurate readings. Any fat shavings that remain on top of the piece will cause erratic readings as the sensor rides over them. Therefore, a means to completely remove fat shavings as the piece is cut becomes extremely important.

Figure 6:
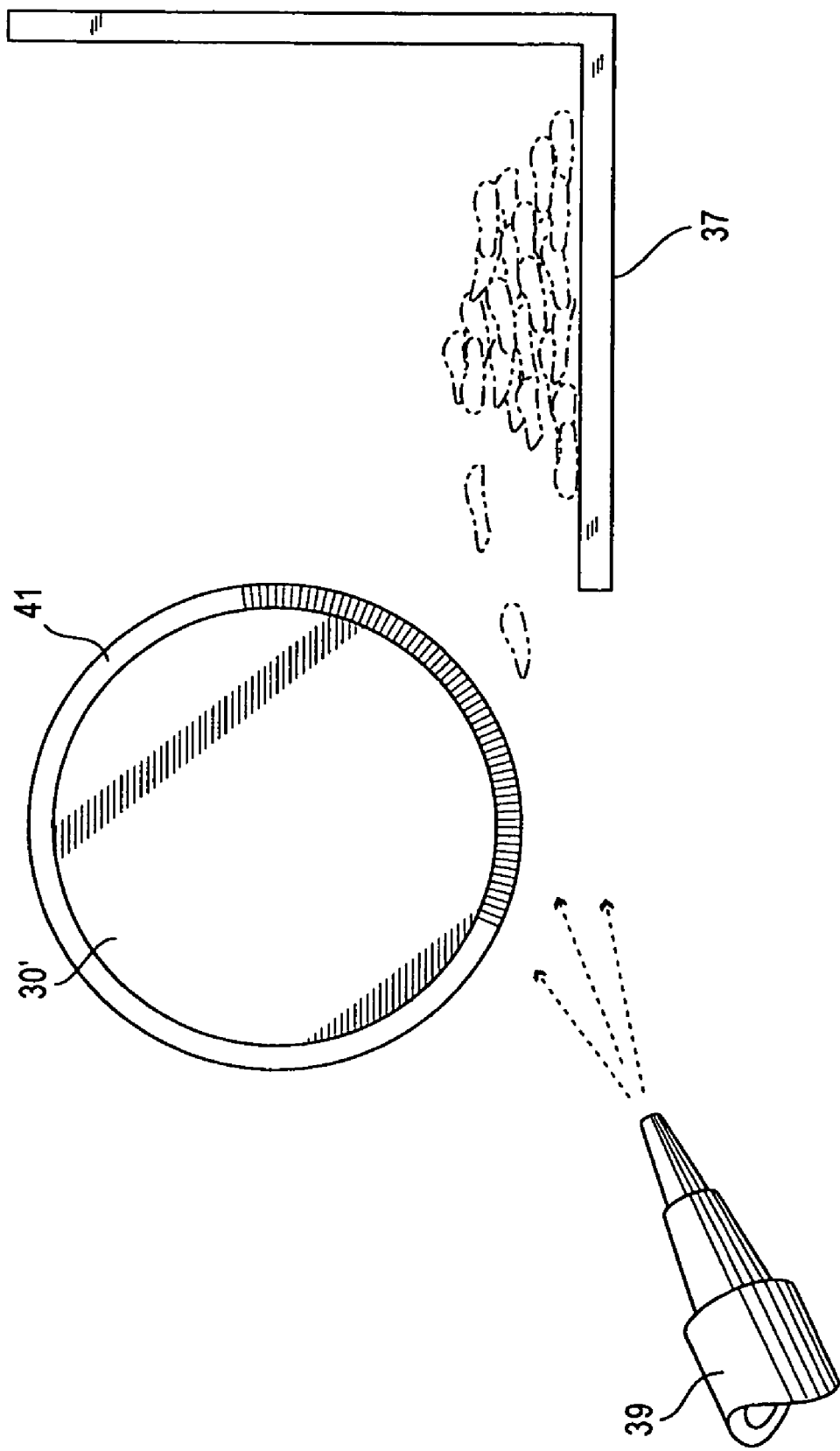
FIG. 6 is an end view of an embodiment of the apparatus, similar to the embodiment depicted in FIG. 4, showing the use of an air nozzle with the cutter blades.

One method developed and tested for promoting the clearance of shavings from the work piece is shown in FIG. 6. A horizontal plate 37 is mounted to the cutter platform to serve as a "collection plate. "One or more air nozzles 39 are mounted upstream of the cutter 10 to blow shavings onto the plate 37. Several tests were conducted using this method for fat shaving collection and it worked very well; very few shavings were left on the cut piece. Alternatively, a vacuum system may be provided to enhance the fat removal process to completely remove the shavings instead of depositing them on a plate. The use of an air stream (vacuum or blowing) is best accomplished in conjunction with the horizontally configured blade system, as seen in FIG. 4. Nevertheless, such an adjunct, to assist in clearing shavings, could readily be used with vertically disposed blades as well.

A trimming machine may utilize two vertical linear stages for controlling the height and angle of the cutter; a horizontal linear stage moves the piece of meat to be trimmed under the cutter at a specified feed rate. The helical blade cutter 10 used in the machine was developed specifically for this application. A sensor for measuring fat thickness is mounted just behind the cutter 10. In this application of the invention, a single fat thickness sensor is used. The single sensor will be used to adjust the height of the cutter 10. Alternatively, two sensors may be installed so that the angle of the cutter 10 also may be controlled.

Therefore, a vacuum system was designed and tested in combination with the inventive cutter. A concave "scoop" was added to the trimming machine just behind the cutter 10. Compressed air nozzles blew the fat trimmings towards the scoop, which guided the trimmings up to the vacuum shoe. Tests on the new vacuum collection system showed that the system worked extremely well for three tests; however, on the fourth pass under the cutter, the collection shoe became clogged with fat trimmings. A larger shoe was incorporated into the design and improved performance. Also, a water mist optionally may be installed into the collection system to help solve the clogging problem.

Several basic cutting tests were conducted to determine the effect of cutting speed and depth of cut on the smoothness of the cut surface. Increasing the cutter speed from 300 rpm to 1000 rpm resulted in a better final surface finish on the trimmed piece. However, further increasing the cutter speed to 1500 rpm and 1500 rpm had no noticeable effect. At these higher cutting speeds, it is likely the meat feed rate could be increased without affecting the quality of the final surface. A new motor enabled depths of cut up to ½" per pass with no noticeable changes in surface quality. The current machine is designed for a maximum depth of cut of ½", so some modification will be necessary to investigate larger depths of cut.

The inventive cutter leaves a very smooth surface finish and can take a large depth of cut without stalling the motor. It also allows air to be blown through it, thus aiding in the collection of the fat trimmings.

It is very preferably that the cutter 10 be rotated in the appropriate direction so that the helix angle on the cutter does not tend to lift the strip, making fixturing difficult. The angle of the helix, and the direction of rotation should be coordinated so that the cutter tends to push the strip down as it cuts instead of lifting it up. Thus, the cutter 10 shown in FIG. 2 is designed to turn counter-clockwise, as viewed from the top, so that the helix blade will tend to push the strip downward. The side helix blades 16–19 slice through the fat while the bottom blade 30 separates the sliced fat from the meat.

In all, three variations of the bottom blade 30 element of the invention were tested. The variation depicted in FIG. 3C had opposing flat blades across the bottom of the cutter similar to that of a lawn mower. The second variation was deemed the pizza cutter blade (FIG. 3A), as it used a round disk in place of the "lawn mower" blade. The third variation was deemed the "donut pizza cutter" blade (FIG. 3B) because it too was made from a pizza cutter blade, but had a hole in the center of the cutter resulting in a donut shaped blade.

The purpose of the "pizza" variations of the bottom blade was to obtain increased blade tip velocity with the bottom blade. Extensive experiments with beef fat demonstrated that there must be a velocity component tangential to the cut direction in order to obtain a smooth cut. The need for this tangential velocity component is reduced with sharper blades, but is never eliminated in a practical sense. The "lawn mower" blades obtain this velocity by mounting them offset from radial. This offset does achieve some tangential velocity but one would expect performance to drop as the blades dull. The "pizza cutter" blades have much higher tangential velocities than the lawn mower blades and would be expected to be able to operate longer without sharpening.

Tests with the pizza cutter indicated that this variation had some difficulty plunge cutting. The "donut pizza cutter variation was designed to obtain the tangential blade velocity benefits of the pizza cutter while improving plunge cutting performance. Tests with the donut pizza cutter demonstrated that it worked well. The resulting finish tended to appear more smeared than the lawn mower cutter, but is very possible that spindle speed should be significantly lower for this cutter.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. An apparatus for plunge cutting fats and meats, comprising:
   at least two spiral shearing blades disposed in a cylindrically helical configuration around a central axis;
   a planar bottom shearing blade mounted perpendicular to said central axis at the distal ends of said spiral shearing blades, said bottom having a circular exterior circumference defining a cutting edge; and
   a shank by which said spiral blades are supported, rotated around said central axis, and moved linearly along said central axis.

2. An apparatus according to claim 1 wherein said spiral shearing blades comprise more than two spiral blades disposed around said central axis.

3. An apparatus according to claim 1 wherein said planar bottom shearing blade comprises an annular blade mounted concentrically around the central axis.

4. An apparatus according to claim 3 wherein said annular blade comprises cutting edges on both an exterior circumference and an interior circumference of said annular blade.

5. An apparatus for plunge cutting soft materials comprising:
   a central axis defining a first imaginary right cylinder, the cylinder having a top perpendicular to the central axis and an imaginary wall everywhere equidistant from the axis;
   at least two cylindrically helical shearing blades within the imaginary cylinder;

at least one bottom blade comprising a planar annular blade disposed concentrically around the central axis, said annular blade having a cutting edge on its exterior circumference; and a shank on said axis for supporting and rotating said shearing blades and said at least one bottom blade about the central axis, and for moving said shearing blades and said at least on end blade axially along said axis.

* * * * *